(12) United States Patent
Kasahara et al.

(10) Patent No.: US 6,456,430 B1
(45) Date of Patent: Sep. 24, 2002

(54) MICROSCOPE

(75) Inventors: Takashi Kasahara, Hino (JP); Katsuyuki Abe, Hachioji (JP); Kenji Kawasaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/883,950

(22) Filed: Jun. 20, 2001

(30) Foreign Application Priority Data

Jul. 17, 2000 (JP) ........................................ 2000-215304

(51) Int. Cl.[7] .............................................. G02B 21/00
(52) U.S. Cl. ...................... 359/380; 359/381; 359/382; 359/385
(58) Field of Search ................................. 359/380, 381, 359/382, 385, 388, 389

(56) References Cited

U.S. PATENT DOCUMENTS

| 5,162,941 | A | * | 11/1992 | Favro et al. ................. 359/235 |
| 5,303,082 | A | * | 4/1994 | Obuchi et al. ............... 359/371 |
| 5,481,401 | A | | 1/1996 | Kita et al. |
| 5,760,950 | A | * | 6/1998 | Maly et al. .................. 359/368 |
| 5,966,204 | A | | 10/1999 | Abe |
| 6,052,223 | A | * | 4/2000 | Yoneyama et al. ......... 359/381 |
| 6,075,646 | A | | 6/2000 | Suzuki |

FOREIGN PATENT DOCUMENTS

JP          11-183124          7/1999

* cited by examiner

*Primary Examiner*—Mohammed Sikder
(74) *Attorney, Agent, or Firm*—Arnold International; Bruce Y. Arnold (57) ABSTRACT

A microscope is disclosed that includes: a light source that emits light in a wavelength range that includes both visible and infrared wavelengths, an illuminating optical system for illuminating a specimen with the light from the light source, an objective lens for gathering light from the specimen and causing it to converge, a light beam dividing unit that divides the beam of light from the objective lens into plural divided light paths such that the wavelength ranges in the divided light paths differ from one another, a magnification conversion optical system in one of the divided light paths which converts the magnification of images formed by light in that divided light path, and an imaging device located in each of at least two of the divided light paths, wherein the objective lens has a magnifying power less than or equal to 32 and a numerical aperture greater than or equal to 0.80. The microscope allows the viewer to change the magnification as well as the wavelength range used to view an image of a specimen while minimizing the introduction of mechanical shock as the magnification and wavelength range used to view the specimen are changed.

9 Claims, 8 Drawing Sheets

MICROSCOPE

BACKGROUND OF THE INVENTION

Recently, in the research field of biology, observations have been made with specimens excised, for example, from the brain. To make the observations be representative of living tissue to the maximum extent possible, it is desirable to observe inside the specimen in areas which have less damage from cutting. To do so, it is necessary to prepare the specimen with as little damage as possible. Therefore, there has been a recent trend to increase the thickness of the specimen. It is common to make observations using infrared light with wavelengths ranging from 700 nm to 1200 nm. These wavelengths provide good permeability with less scattering in order to observe areas inside the thick specimens, as published in Japanese Patent Publication H10-20198.

Also, in the field of observing biological samples with a microscope, what is termed a "patch clamp" method is widely used. In this method, a micro-electrode made of glass having a diameter of only a few microns is glued to the surface of a cell membrane using a manipulator. This allows, for example, the electric properties of the calcium channel of the cell membrane to be investigated.

After searching to locate the specimen using a low magnification objective lens of a microscope, it is then necessary to switch the degree of the magnification in order to enlarge the viewed image. This allows cells of the specimen to be observed with high magnification and allows one to conduct operations as described above, as well as to observe the cells using fluorescence.

In the prior art, switching the degree of magnification in a microscope is conducted by arranging both a low magnification objective lens and a high magnification objective lens on the revolver of a microscope. Rotation of the revolver inserts and withdraws the low magnification objective lens and the high magnification objective lens, in an alternating sequence, into the light path. However, there is quite a mechanical shock to the system upon switching objective lenses by operating the revolver, and therefore it is difficult to keep the specimen from being disturbed during this process. In particular, in the case of the "patch clamp" method, contact of the objective lens with one or more tools needed in performing the method, such as the micro-electrode, is likely to occur. As a result of either actual contact or mere vibration during the changing of objective lenses in order to change magnification, the micro-electrode's needle-shaped tip sometimes slips out of the specimen or the specimen moves out of the field of view. This requires that the same operation as before be performed again, after first switching back to the low magnification objective lens in order to locate the specimen once more. As can be imagined, this results in decreased efficiency.

In situations in which observations are also to be made using a different range of wavelengths, an operation such as switching one or more filters in the illuminating or transmitted light paths, or switching the light source itself, becomes necessary. There is quite a mechanical shock to the system upon switching these items as well. Thus, such switching operations can also cause the micro-electrode's needle-shaped tip to slip out of the specimen or the specimen itself to move relative to the field of view.

BRIEF SUMMARY OF THE INVENTION

The object of the present invention is to enable a microscope user to be able to switch from a relatively wide field of view having a low magnification to a relatively narrow field of view having high magnification without having to rotate a different object lens into the light path, and to enable observations to be made using different wavelength ranges without requiring a switching operation of filters or light sources that causes mechanical shock to the specimen being viewed.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is a microscope which allows one to observe a specimen with different magnifications without switching the objective lens, and also, which allows one to change the wavelength range of the observation without a replacement operation of filters in the light paths of the illuminating light or transmitted light or a replacement operation of the light source.

The microscope of the present invention includes a light source that emits light in a wavelength range that includes both visible and infrared wavelengths, an illuminating optical system that illuminates a specimen with the light from the light source, an objective lens for gathering light from the specimen and causing it to converge, a light beam dividing unit that divides the beam of light from the objective lens into plural divided light paths such that the wavelength ranges in the divided light paths differ from one another, a magnification conversion optical system in one of the divided light paths for converting the magnification of images formed by light in that divided light path, and an imaging device located in each of at least two divided light paths. The objective lens should have a magnifying power less than or equal to 32 in order to provide a wide field of view, and the numerical aperture should be not less than 0.80 in order to provide a resolution sufficient to observe fine parts of the specimen. The imaging devices may comprise any known means to capture a visible or infrared image in the light path and to display the image to a viewer. For example, film and a means to view the developed film, or a CCD array with display means may be used.

Preferably, the light path having the magnification conversion optical system is arranged in a divided light path having an optical axis that is substantially orthogonal to the optical axis of the objective lens. Also, following the magnification conversion optical system, the divided light path preferably includes a deflecting optical element that deflects the light so that its optical axis is once again substantially parallel to the optical axis of the objective lens, and wherein the following Condition (1) is satisfied $$150 \text{ mm} \leq D \leq 300 \text{ mm} \qquad \text{Condition (1)}$$

where

D is the length of the divided light path that contains the magnification conversion optical system, as measured from where the light path division occurs to the deflecting optical element.

In addition, preferably the magnification conversion optical system can be adjusted to change the amount of magnification, and the following Condition (2) is satisfied $$\beta 2/\beta 1 \geq 5 \qquad \text{Condition (2)}$$

where $\beta 2$ is the highest magnification of the magnification conversion optical system, and $\beta 1$ is the lowest magnification of the magnification conversion optical system.

The microscope of the present invention enables one to observe using infrared light as well as visible light using a light source that emits in both the visible and infrared wavelengths, and this enables one to observe deep inside a thick specimen using the infrared range of wavelengths. By virtue of the present invention including both an objective lens and a magnification conversion optical system, the microscope of the present invention can provide the user with a wide field of view in the case where the magnification of the magnification conversion optical system is set to a low value, and can provide a high resolution sufficient to observe fine parts of the specimen in the case where the magnification of the magnification conversion optical system is set to a high value, without requiring replacement of the objective lens.

In this way, a switching operation of the objective lens is not necessary with the microscope of the present invention. The microscope of the present invention enables one to observe a specimen, even a thick specimen, using a wide field of view (i.e., low magnification) as well as a narrow field of view (i.e., high magnification) by changing the magnification of the magnification conversion optical system. A light path dividing unit divides the light from a specimen following the objective lens into plural light paths of different wavelength ranges. Thus, the present invention enables one to simultaneous observe a specimen using different wavelengths ranging, for instance, from infrared light to visible light without there being a switching operation required.

The light path dividing unit may employ a dichroic mirror to divide the light into two paths which differ in wavelength, or it may employ a partially reflective mirror, such as a 50% reflective mirror, to split the light into two paths, followed by a wavelength selective device, such as a filter, in each light path to make the wavelength ranges in the two paths different from each other. Further, a second light source may be used in order to excite fluorescence in the specimen, coupled with a separation optical unit to separate the fluorescence from the sample so that the images produced by the fluorescence may be observed simultaneously with images in other wavelength ranges.

What is termed in the art as an "obverse image" is provided by the first light path (the one that is not deflected by the light path dividing unit), while what is termed in the art as a "backside image" is provided by the second light path (the one deflected by the light path dividing unit). Therefore, in order to avoid this difference (i.e., artifact) in the appearance of the two images, the second light path preferably includes a light path deflection optical element, such as a mirror, in order to deflect the second light path (the one formed by the light path dividing unit) once more. This not only makes both images "obverse" so the two have the same appearance, but it also makes the second light path once more substantially parallel to the optical axis of the objective lens. The second light path deflection optical element (e.g., formed of a mirror) is arranged on the optical axis of the second light path following the magnification conversion optical system, and the above Condition (1) is satisfied.

The purpose of Condition (1) above will now be explained. If the lower limit for D is not satisfied, the second imaging device becomes too close to the first light path to accommodate the magnification conversion optical system within the light path. Also, the second imaging device is vulnerable to undesirable vibrations since the distance from the light path deflection optical element to the second imaging device is long. If the upper limit for D is not satisfied, the second imaging device may be vulnerable to the influence of heat and may make structural contact, since the second imaging device comes so close to the light source.

A magnification conversion optical system may, optionally, also be arranged in the first light path, in which case it is convenient if the magnifications in the two light paths are capable of being matched. This can be accomplished by making at least one of the two magnification conversion optical systems have a magnification that can be varied. This makes it possible, in both of the two light paths, to change the magnification to a high value so as to observe fine details of a specimen using either light path. When making observations using an illuminating light source that causes one or more dyes in the specimen to fluoresce, it is desirable that the distance D be such that heat from the exciting light source does not damage the specimen or the imaging device in the second optical path. Condition (1) also satisfies these goals.

When making observations using infrared light, microscope operations such as searching for the location of the specimen (performed with low magnification) and the "patch clamp" method (performed with high magnification) usually are conducted. For these operations, the magnification conversion optical system must be capable of varying the magnification over a large ratio, and this requires more space. Also, a light path for infrared light requires a longer light path than that required with visible light. Since the first light path is not folded or bent (but rather is stretched straight above a specimen), an imaging device must be located at a high position if the first light path is an infrared light path. This is not good because such a design is vulnerable to the influence of unwanted vibrations. Because the second light path is folded or bent twice, it is longer than the first light path. Thus, using the second light path for the infrared path not only avoids the vibration problem associated with using the first light path for the infrared path as discussed above, it also provides the necessary room for moving components during zooming. Thus, it is desirable that the second light path should be an infrared light path.

Also in observing a specimen, it is necessary to provide as wide a viewing field as possible with a low magnifying power, as well as to provide the capability for observing with high magnifying power in order to observe fine details of a specimen. To do this, it is preferable that the above Condition (2) is satisfied.

Various embodiments of the present invention will now be explained in detail with reference to the drawings.

Embodiment 1

Figure 1:
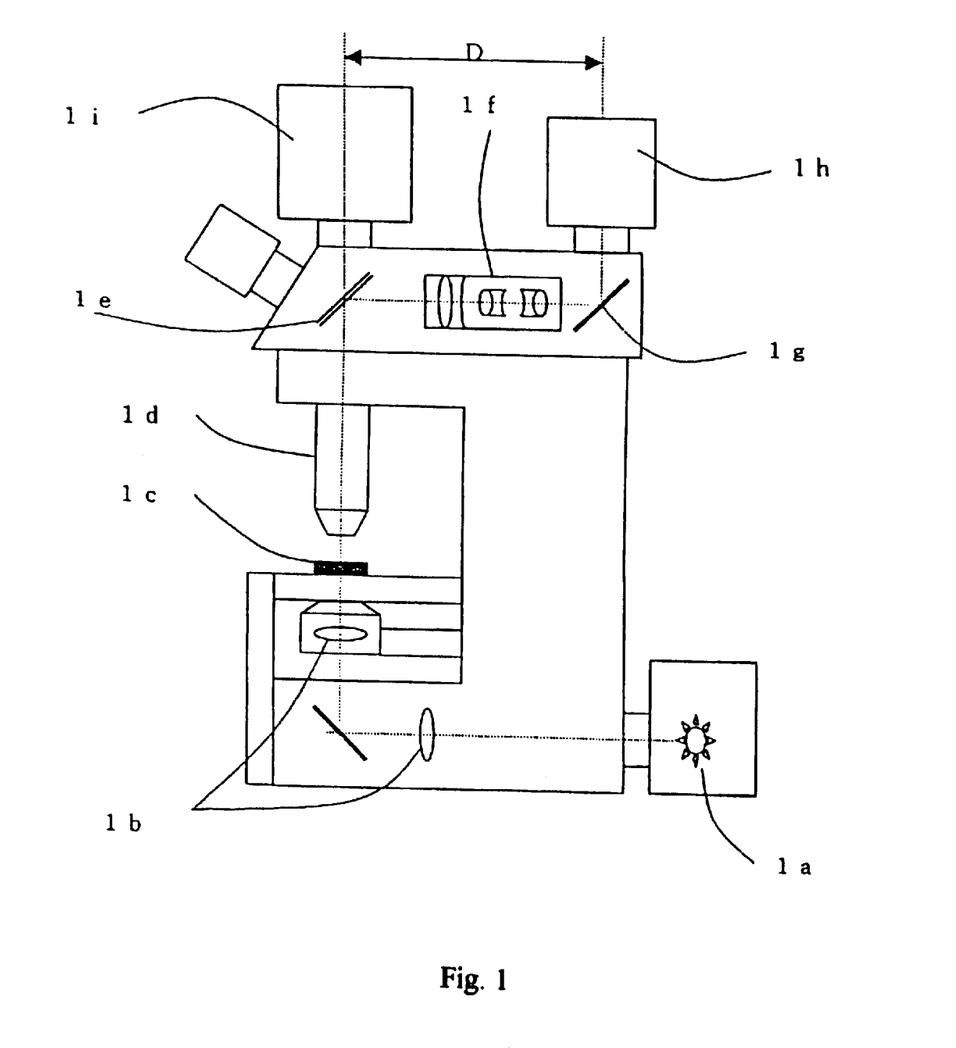
FIG. 1 shows a first embodiment of the microscope of the present invention.

FIG. 1 shows a first embodiment of the microscope of the present invention. A light source 1a emits light having both visible and infrared wavelengths, an illumination optical system 1b introduces the light to a specimen 1c, an objective lens 1d is provided, having a magnifying power of 20 and a numerical aperture of 0.95, which condenses the light from the specimen 1c, a dichroic mirror 1e divides the light from the specimen into two light paths (namely, a first light path that is transmitted and a second light path that is reflected, depending on the wavelength of the light), a magnification conversion optical system 1f (which may be formed of a variable lens) is provided in the second light path, as well as a mirror 1g following the magnification conversion optical system to deflect the light so that it once more travels in a direction substantially parallel to the optical axis of the objective lens 1d. Further, imaging devices 1i (in the first light path) and imaging device 1h (in the second light path) are provided for capturing and displaying the images to a viewer.

By the objective lens 1d having a magnifying power of 20 and a numerical aperture of 0.95, when the magnifying power is low, observation with lower magnification is feasible with a larger numerical aperture than with the prior technology. On the other hand, when the magnifying power is high, observation with higher magnification is feasible with the same numerical aperture as with the prior technology. Thus, there is no need to switch the objective lens as in the prior technology, since the present invention allows observation with high magnifying power and observation with low magnifying power to be performed in the second light path without switching the objective lens.

A light beam from the objective lens 1d is divided using the dichroic mirror 1e into two light beams of different wavelength ranges. The light beam deflected in the orthogonal direction to the optical axis of the objective lens, that is, the light beam in the second light path is passed through the magnification conversion optical system 1f, and is led to the imaging device 1h by being deflected by the mirror 1g. The light in the first optical path (i.e., that is transmitted by the dichroic mirror 1e) is incident onto the imaging device 1i.

In this manner, in the first optical path and the second optical path, simultaneous observations can be made using light of different wavelength ranges. For instance, if a dichroic mirror that separates infrared light and a visible light is used, it is possible to make simultaneous observations of the image in both infrared and visible light. If a dichroic mirror is used that separates visible light of different wavelength ranges, it is possible to make simultaneous observation of the images using visible light having different wavelength ranges (for instance, a red light versus a green light).

Figure 2:
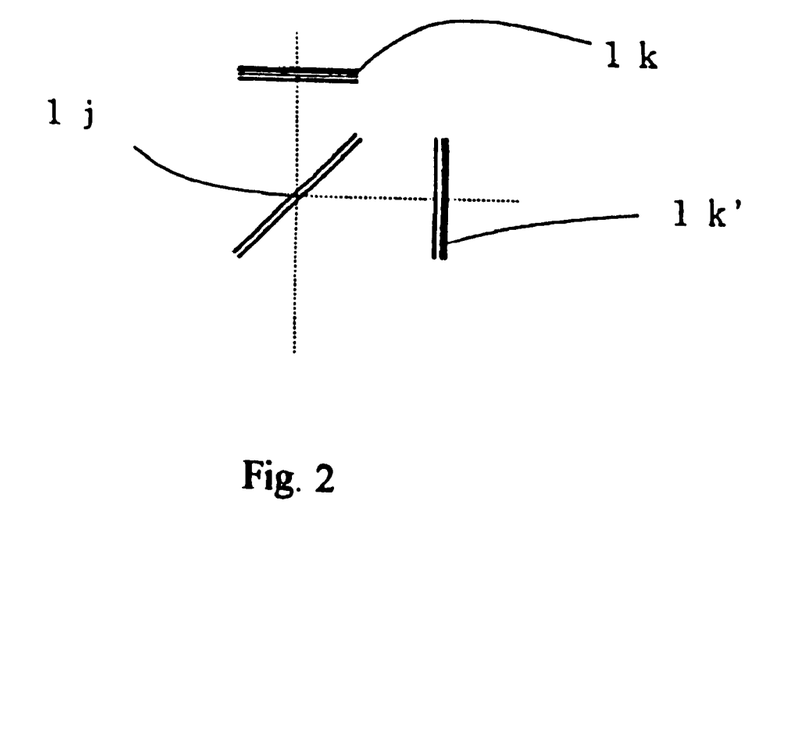
FIG. 2 shows a different light path dividing unit that may be used with the first embodiment of the invention, i.e., in lieu of the light path dividing unit shown in FIG. 1.

As shown in FIG. 2, a light path dividing unit such as a partially reflective surface 1j may replace the dichroic mirror 1e. In such a case, filters 1k, 1k' may be used to select particular ranges of wavelengths in one or more of the divided light paths after the light path division, in order to obtain a similar effect as when using a dichroic mirror.

Embodiment 2

Figure 3:
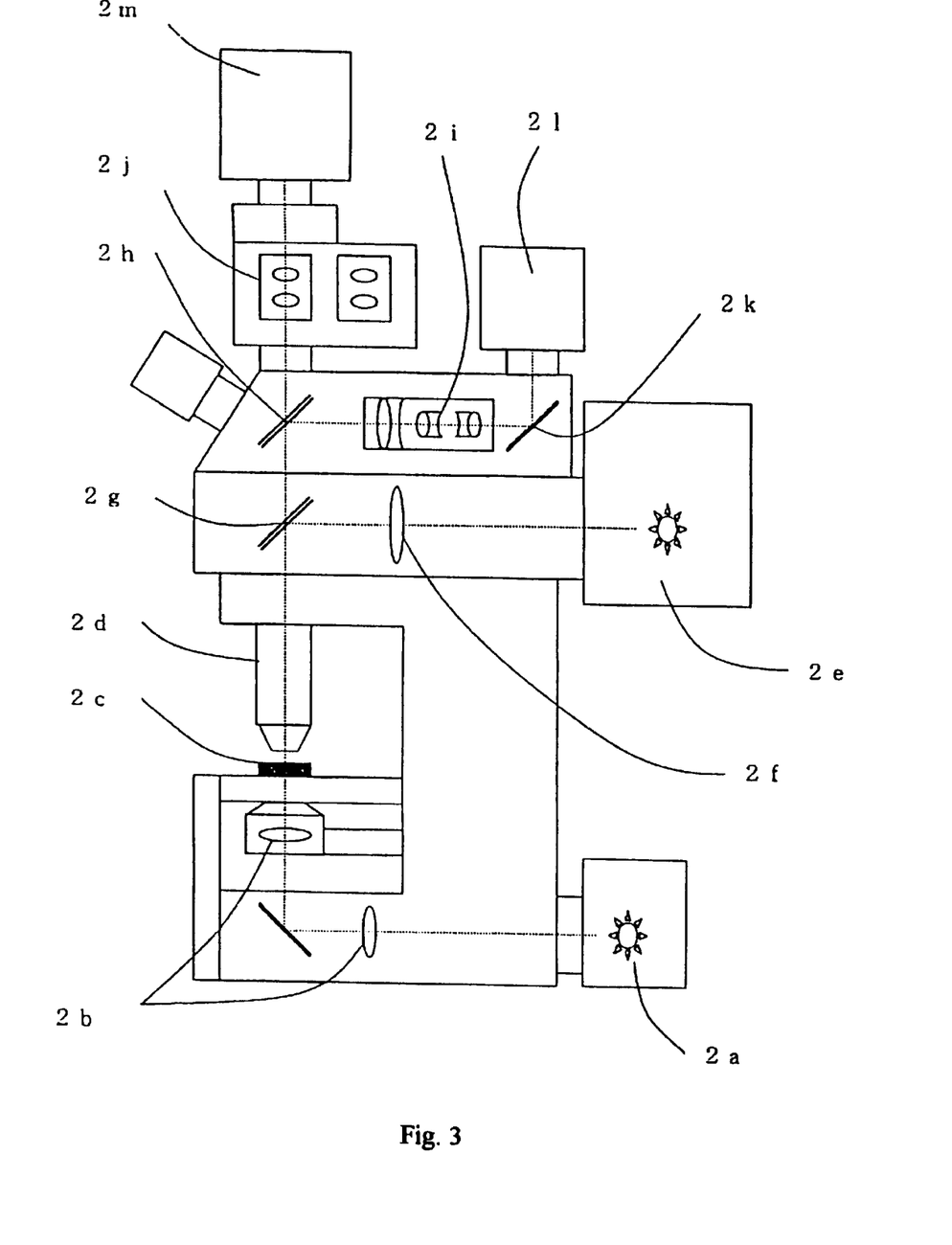
FIG. 3 shows a second embodiment of the microscope of the present invention.

FIG. 3 shows a second embodiment of the microscope of the present invention. In this embodiment a first light source 2a emits light that includes both visible and infrared wavelengths, a first illumination optical system 2b directs the light beam from the first light source 2a to the specimen 2c, the objective lens 2d (having a magnifying power of 20 and a numerical aperture of 0.95), gathers the light from the specimen and condenses it. A fluorescence excitation light source 2e emits light from light source 2e which is directed via a dichroic mirror 2g to the specimen 2c in order to cause the specimen to fluoresce. The dichroic mirror 2g then transmits the fluorescence from the specimen to light path dividing unit 2h and reflects the excitation light back towards its source. The light path dividing unit 2h then divides the light from the specimen into two light paths, a first light path that is transmitted and a second light path that is reflected by the light path dividing unit. Each light path includes a magnification conversion optical system 2j, 2i, respectively. The mirror 2k deflects the light in the second light path following the magnification conversion optical system 2i so that it travels in a substantially parallel direction to the optical axis of the objective lens 2d. In each light path, a respective imaging device 2m, 2l is positioned to capture the image and display it to the observer.

In this embodiment the fluorescence excitation lighting system includes the fluorescence excitation light source 2e, the fluorescent excitation illumination optical system 2f and the dichroic mirror 2g which separates the illumination light and fluorescence from the sample and enables simultaneous observations of the specimen to be made with in two or more wavelength ranges.

As shown in FIG. 3, by having one of the two magnification conversion optical systems include two or more lenses of fixed focal length that can be selectively inserted into the light path, it is possible to match the magnification in the two light paths when making observations at different wavelength ranges. Thus, both light paths can be converted to have high magnification so as to observe finer details of the specimen.

It is necessary that there be a fluorescence excitation light source 2e, a fluorescence excitation illumination optical system 2f, and the dichroic mirror 2g (which separates the illuminating light and the fluorescence) in order to make observation with fluorescent light possible. In this embodiment, in order to allow room for the magnification conversion optical system 2i, the distance D (measured as shown in FIG. 1) is made to be 170 mm.

Embodiment 3

Figure 4:
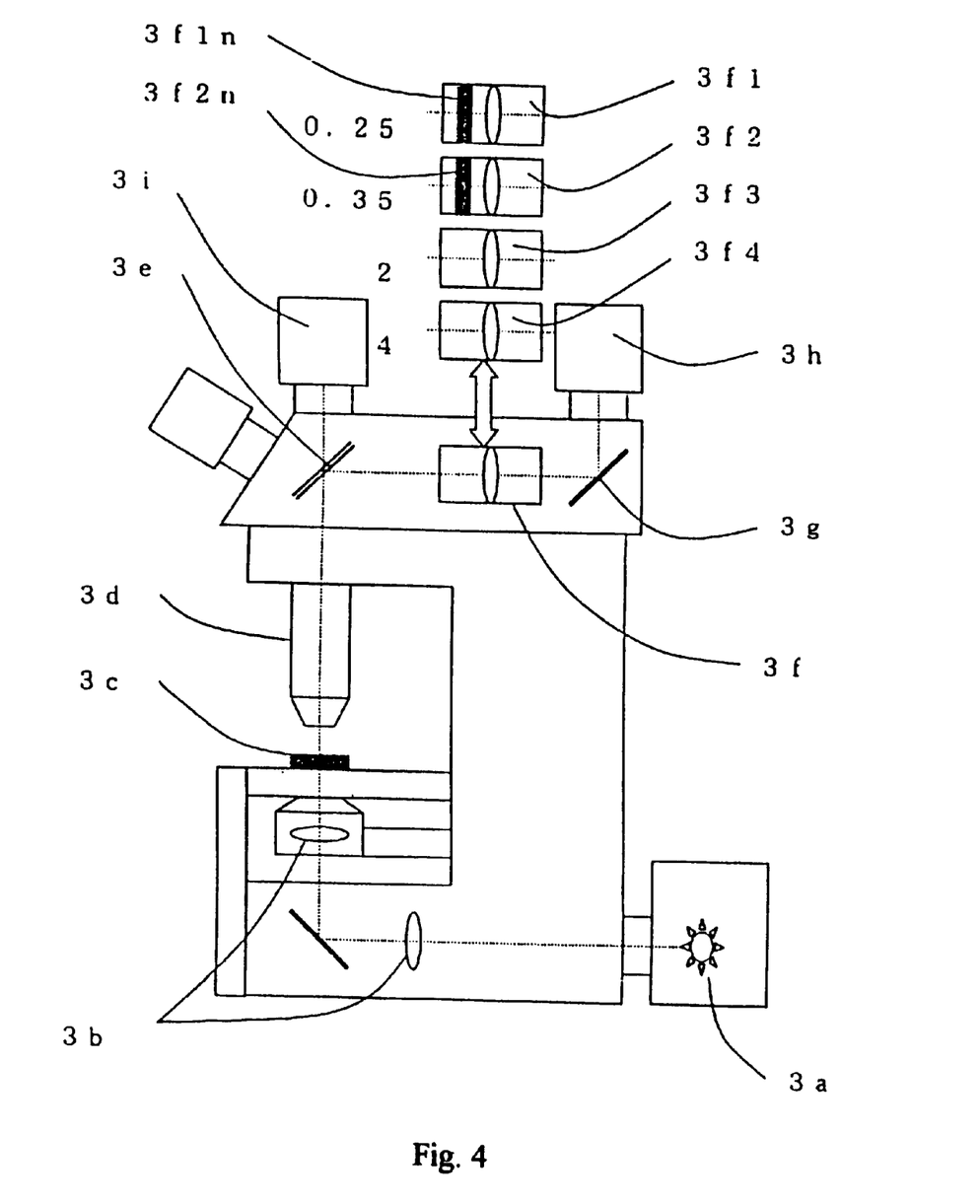
FIG. 4 shows a third embodiment of the microscope of the present invention.

FIG. 4 shows a third embodiment of the microscope of the present invention. In this embodiment a light source 3a, which emits both visible and infrared light wavelengths, and an illumination optical system 3b are used to illuminate a specimen 3c. An objective lens 3d (having a magnifying power of 20 and a numerical aperture of 0.95) gathers light from the specimen and causes the light to converge. Light path dividing means 3e, formed of a dichroic mirror, divides the light from the sample into a transmitted beam which is imaged by imaging device 3*i* and a reflected beam, which passes through a magnification conversion optical system 3*f* (formed of a variable lens). A mirror 3*g* is used to deflect the beam after it has passed through the magnification conversion optical system so that it once again travels substantially parallel to the optical axis of the objective lens. Imaging devices 3*i* and 3*h* are employed to convert the light to a visible image that can be viewed. As before, the imaging devices can be any known means to capture an image (whether IR or visible) and display it to an observer, such as film, a CCD array with display means, and so on.

In this embodiment of the present invention, several lenses 3*f*1, 3*f*2, 3*f*3, 3*f*4 with different magnifications are arranged so as to be selectively inserted, one at a time, into the second light path in place of the variable lens 3*f* As illustrated, the magnification of the lenses 3*f*1–3*f*4 range from 0.25 to 4, in order to convert the magnification in the second light path. In order to obtain both a wide field of view having low magnification and also provide for a magnification sufficiently high to observe the finer details of a specimen, it is desirable to have a large value for the ratio β2/β1, where β1 and β2 are as defined above.

Comparing designing a zoom lens at low magnification with that of a zoom lens at high magnification, the design at low magnification is more difficult because the lower magnification requires a higher numerical aperture on the emergent side. Even if such a design can be accomplished, the cost will be higher due to the fact that more lens elements are required. Hence, compared with a zoom lens at high magnification, if the numerical aperture on the incident side of a zoom lens at low magnification is small, the numerical aperture on the emergent side can be small. As a result, designing such a zoom lens will be easy and high costs can be prevented. Making the numerical aperture on the light incident side in a variable lens to be small means that all numerical apertures of the objective lens cannot be used. Therefore the resolution is degraded. However, this is not a problem because high resolution is not required for observations at low magnification because the main task at low magnification is simply to locate the position of the specimen. Thus, high resolution is only needed for making observations of the finer details of a specimen at high magnification.

In addition, because the magnification of a variable lens varies, the brightness of the image of the specimen also varies. If a variable lens were to be used, to achieve a constant brightness of an image of the specimen would require adjustment of the illuminating light every time the magnification is varied. However, when separate lenses of fixed magnification (such as 3*f*1, 3*f*2 in FIG. 4) are used in lieu of a variable lens, an appropriate neutral density filter (ND filter) such as 3*f*1*n* or 3*f*2*n* can be placed in the second light path simultaneously with the insertion of the respective lens 3*f*1 or 3*f*2.

Figure 5:
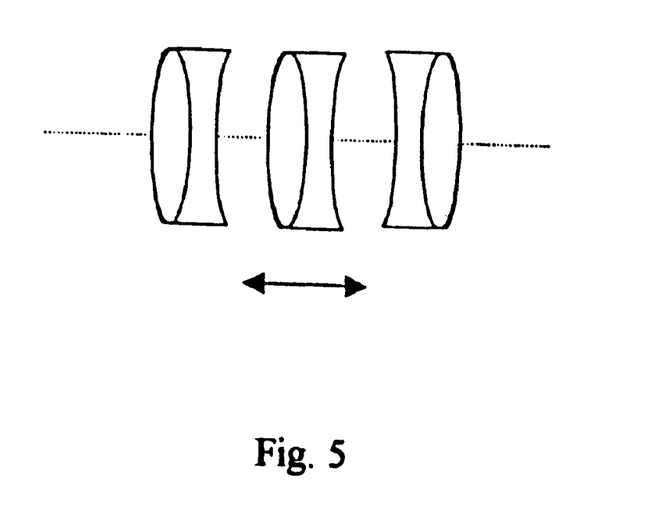
FIG. 5 shows a different magnification conversion optical system that may be used with the microscope of the present invention, in lieu of the one shown in FIGS. 1 and 3.

As shown in FIG. 5, a different magnification conversion optical system may also be used with the microscope of the present invention, in lieu of the one shown in FIGS. 1 and 3. In the magnification conversion optical system of FIG. 5, the magnification is changed by moving the center component along the optical axis, as indicated by the arrow.

Embodiment 4

Figure 6:
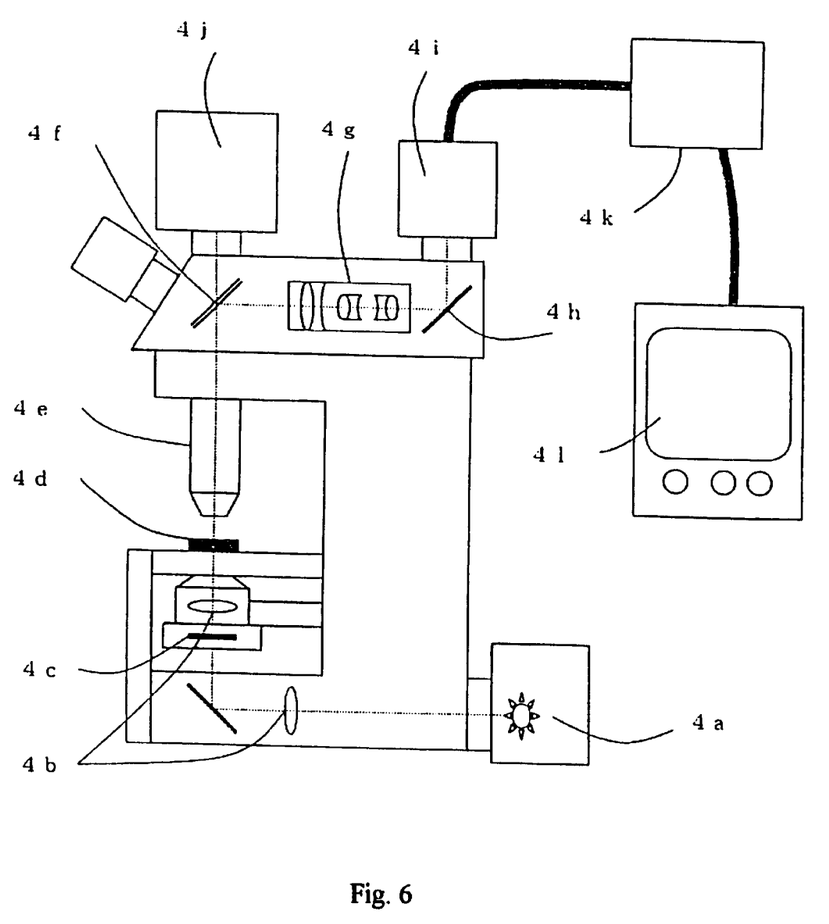
FIG. 6 shows a fourth embodiment of the microscope of the present invention.

FIG. 6 shows a fourth embodiment of the microscope of the present invention. In this embodiment, a light source 4*a* emits light having both visible and infrared wavelengths, and an illumination optical system 4*b* directs the light from the light source to the specimen 4*d*. An opening part forms a partial opening 4*c* and is placed in the illumination optical system 4*b*. An objective lens 4*e* (having a magnifying power of no more than 20 and a numerical aperture of not less than 0.85) is placed in the light path of the light that illuminates the specimen. A light path dividing unit 4*f* (formed of a dichroic mirror) divides the light from the specimen into a transmitted and reflected beam. A magnification conversion optical system 4*g*, formed of a variable lens, is placed in the second optical path and a mirror 4*h* is employed to deflect the light that has passed through the magnification conversion optical system 4*g* so as to again travel parallel to the direction of the optical axis of the objective lens. An imaging device, 4*i*, such as a CCD detector array, captures the image light, after which it may be fed to an image processing device 4*k* and then displayed on a display device 4*l*.

With the microscope of the present invention, an image of high quality can be obtained by illuminating the specimen at an angle to the optical axis using a partial opening 4*c* in the illumination optical system, enhancing the contrast for the image processing device 4*k* and the display device 4*l*. This is very helpful to give some contrast to a transparent specimen when the illumination is by infrared wavelengths.

Figure 7A:
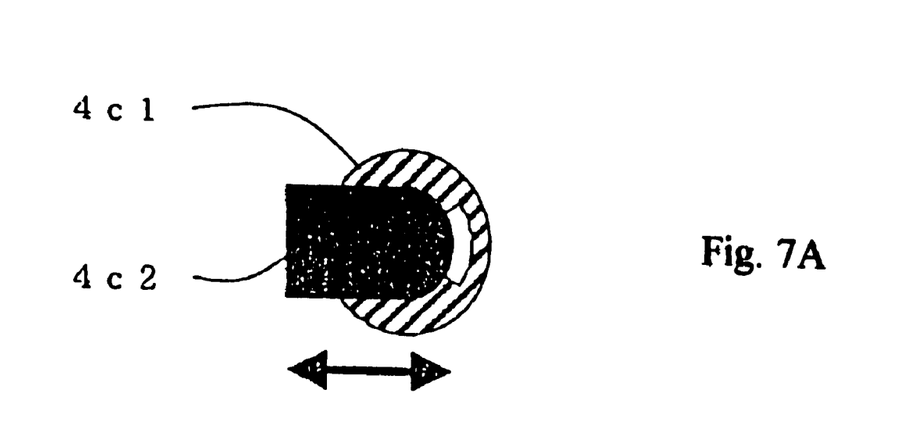
FIG. 7A shows the construction of the opening part.
Figure 7B:
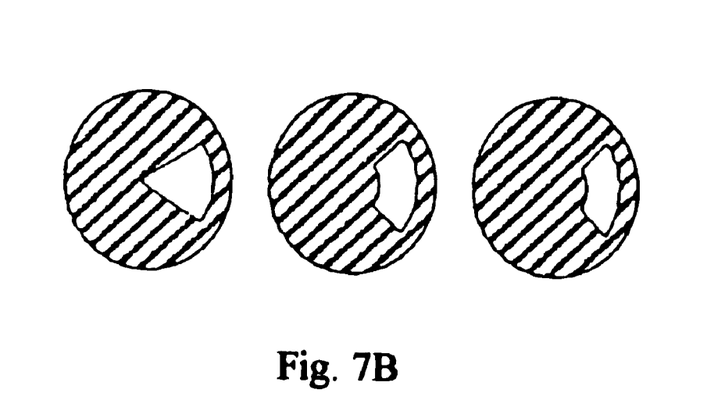
FIG. 7B shows a process of changing the opening of the opening part shown in FIG. 7A.

As shown in FIG. 7A, the opening part is formed in two pieces, as follows: part 4*c*1 has an opening in the shape of a segment of a circle, similar to that of a piece of pie, and a shielding part 4*c*2 is placed so as to be moveable along the aperture of the segment of the circle, in the direction of the horizontal arrow. Such a construction allows the shape of the opening to be changed, as shown in FIG. 7B. This provides a three-dimensional sense to the viewed image with a brightness and illumination angle that can be changed depending on the thickness of the specimen, degree of scattering, and the depth of observation. When this construction is combined with the image processing device 4*k*, observations with high quality images can be obtained.

As explained above, in the microscope of the present invention, a switching operation of the objective lens in order to change the magnification is no longer necessary. It is possible to view a specimen with a wide field of view having a low magnification, as well as to view the specimen using a high magnification and resolution, even on the thick specimen, without having to revolve a different objective lens into position.

In addition, simultaneous observations with different wavelength ranges, such as infrared light and visible light, infrared light and fluorescence from the specimen, and different colors of visible light can be performed without a switching operation of the light source being required.

The objective lens in each embodiment of the present invention should be either a type where light exits from an objective lens and converges to one point (a so-called "finite distance compensation type" of objective lens) or a type where light exiting from an objective lens travels in a parallel-ray beam, i.e. a collimated beam. (This latter type is a so-called "infinite distance compensation type" of objective lens.) In each of the specific embodiments given herein, a finite distance compensation type of objective lens is used. Therefore, there is no image formation lens between the objective lens and the light path dividing unit (1*e*, 2*h*, 3*e*, 4*f*). Conversely, in the case where the objective lens is of the infinite distance compensation type, as the rays from such an objective lens are parallel, i.e., the light is collimated, an image formation lens (not shown in the drawings) needs to be placed in the path of the collimated light. This image formation lens is often placed between the objective lens and the light path dividing unit (1e, 2h, 3e, 4f). Also, the image formation lens can be placed in position after the light has passed through the light dividing unit or after being reflected from the light dividing unit.

Figure 8:
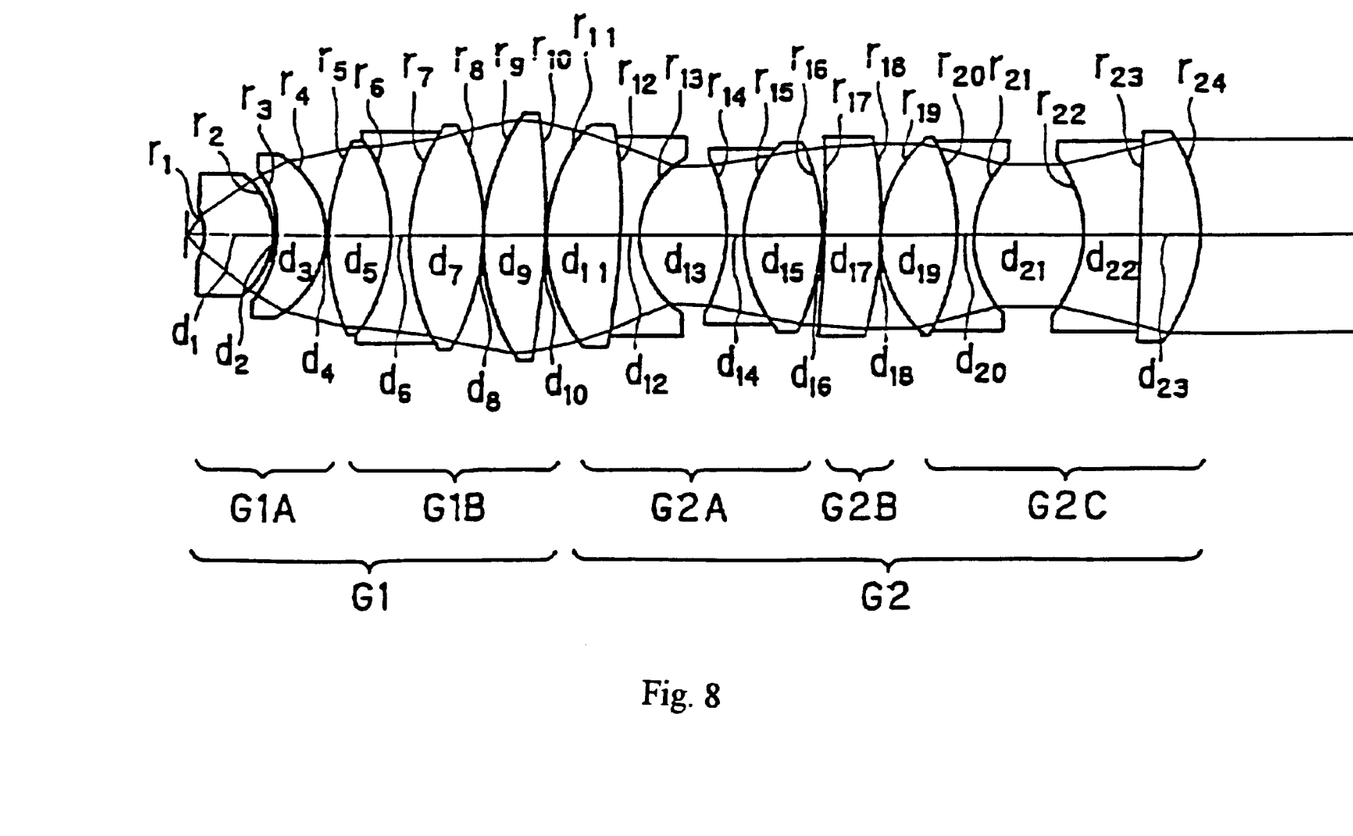
FIG. 8 is a cross section showing details of the lens element structure that may be used as the objective lens in any of the embodiments the invention.

FIG. 8 is a cross section showing details of the lens element structure that may be used as the objective lens in Embodiments 1–4 of the invention. The objective lens of FIG. 8 includes, in sequential order from the object side, a first lens group G1 and a second lens group G2. The first lens group G1 is formed of a lens subgroup G1A and a lens subgroup G1B. Lens subgroup G1A is formed of two meniscus-shaped optical elements with their concave surfaces facing the object side, and lens subgroup G1B is formed of a cemented triplet and a biconvex lens element. The cemented triplet is formed of the following lens elements, in order from the object side: a biconvex lens element, a biconcave lens element, and a biconvex lens element. The second lens group G2 is formed of lens subgroups G2A, G2B and G2C. Lens subgroup G2A is a Gauss lens set, and lens subgroup G2C is a Gauss lens set. The Gauss lens set G2A is formed of, in order from the object side, a biconvex lens element that is cemented to a biconcave lens element (thereby forming a meniscus-shaped optical element with its concave surface on the image side), and a biconcave lens element that is cemented to a biconvex lens element (thereby forming a meniscus-shaped optical element with its concave surface on the object side). The lens subgroup G2B is formed of a positive meniscus lens element with its concave surface on the object side. The Gauss lens set G2C is formed of a biconvex lens element that is cemented to a biconcave lens element (thereby forming a meniscus-shaped optical element with its concave surface on the image side), and a negative meniscus lens element with its concave surface on the object side that is cemented to a positive meniscus lens element with its concave surface on the object side (thereby forming a meniscus-shaped optical element with its concave surface on the object side).

Table 1 below lists for each surface, in order from the object side, the surface number #, the radius of curvature R (in mm), the on-axis spacing d (in mm) between surfaces, as well as the index of refraction $N_d$ and the Abbe number $\upsilon_d$ (both at the d line) of each lens element shown in FIG. 8. In the bottom portion of the table are listed the values of the numerical aperture NA, the focal length F of the objective lens, and the working distance WD between the object surface and the first lens surface of the first lens group G1.

TABLE 1

| # | R | d | $N_d$ | $\upsilon_d$ |
|---|---|---|---|---|
| 1 | −4.8742 | 4.8257 | 1.75500 | 52.32 |
| 2 | −5.4698 | 0.2000 | | |
| 3 | −8.2501 | 3.5000 | 1.56907 | 71.30 |
| 4 | −6.7964 | 0.1500 | | |
| 5 | 14.8325 | 4.6500 | 1.43875 | 94.99 |
| 6 | −11.8551 | 1.4000 | 1.75500 | 52.32 |
| 7 | 16.0509 | 5.1500 | 1.43875 | 94.99 |
| 8 | −16.7495 | 0.2000 | | |
| 9 | 16.6372 | 4.2443 | 1.56907 | 71.30 |
| 10 | −65.8633 | 0.2000 | | |
| 11 | 12.4106 | 5.1500 | 1.49700 | 81.14 |
| 12 | −46.1798 | 1.3800 | 1.52944 | 51.72 |
| 13 | 6.3567 | 6.4169 | | |
| 14 | −11.5515 | 1.2500 | 1.52944 | 51.72 |
| 15 | 10.5297 | 5.6154 | 1.49700 | 81.14 |
| 16 | −15.2713 | 0.2000 | | |
| 17 | −117.7917 | 4.0077 | 1.56907 | 71.30 |

TABLE 1-continued

| # | R | d | $N_d$ | $\upsilon_d$ |
|---|---|---|---|---|
| 18 | −33.7967 | 0.1500 | | |
| 19 | 10.0545 | 5.2930 | 1.49700 | 81.14 |
| 20 | −15.1795 | 1.3000 | 1.52130 | 52.55 |
| 21 | 8.0217 | 7.7007 | | |
| 22 | −9.5247 | 4.2061 | 1.58313 | 59.38 |
| 23 | −275.8289 | 4.3000 | 1.59551 | 39.29 |
| 24 | −12.9456 | | | |

NA = 0.8
F = 9 mm
WD = 1.4 mm

Figure 9:
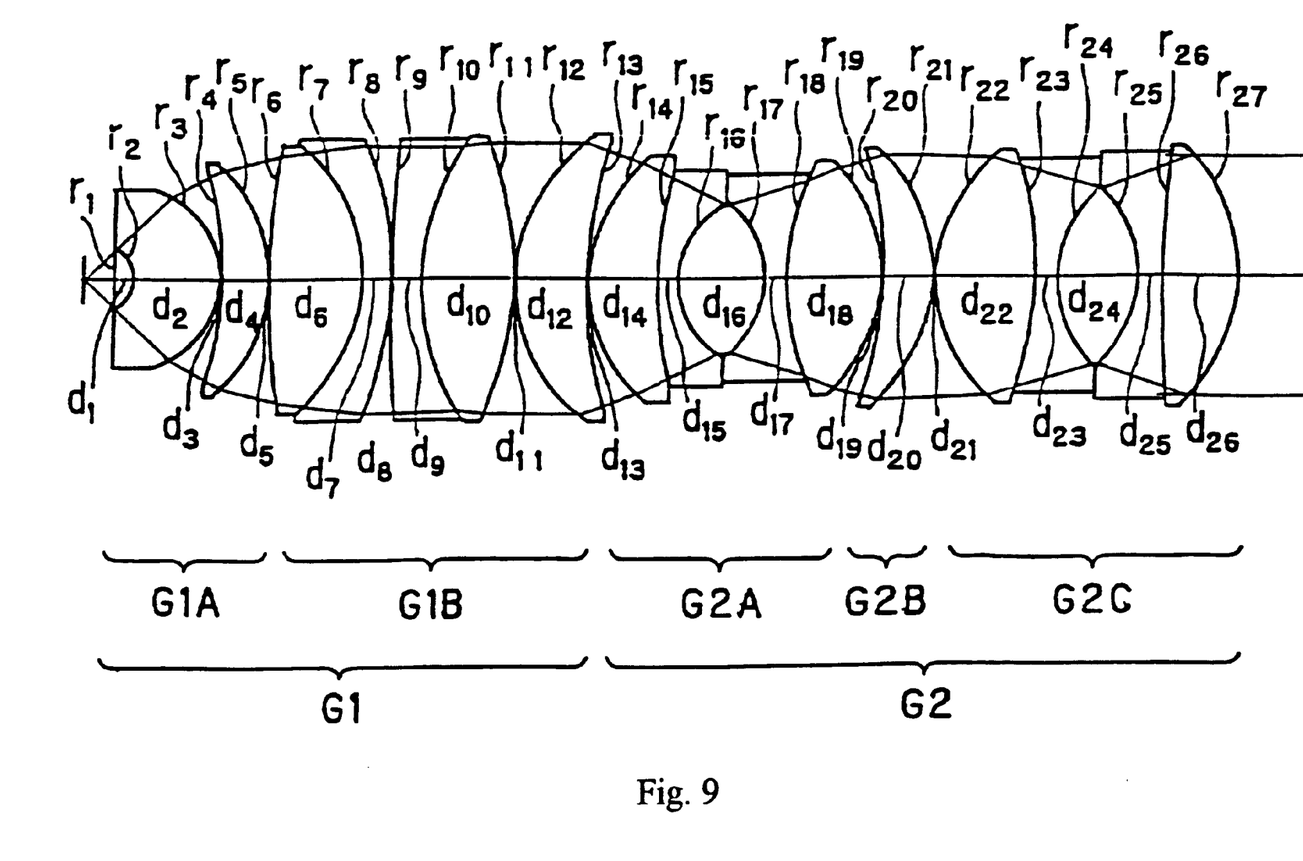
FIG. 9 is a cross section showing details of an alternative lens element structure that may be used as the objective lens in any of the embodiments of the invention.

FIG. 9 is a cross section showing details of the lens element structure that may be used as the objective lens in Embodiments 1–4 of the invention. The objective lens of FIG. 9 includes, in order from the object side, a first lens group GI and a second lens group G2. The first lens group G1 is formed of a lens subgroup GIA and a lens subgroup G1B. Lens subgroup G1A includes a cemented doublet formed of a planoconvex lens element that is joined to a meniscus lens element with its concave surface on the object side, and a positive meniscus lens element with its concave surface on the object side. Lens subgroup G1B is formed of a cemented doublet formed of a biconvex lens element that is joined to a negative meniscus lens element with its concave surface on the object side, a cemented doublet formed of a negative meniscus lens element with its concave surface on the image side that is joined to a biconvex lens element, and a positive meniscus lens element with its concave surface on the image side.

The second lens group G2 is formed of lens subgroups G2A, G2B, and G2C, in order from the object side. Lens subgroup G2A is a Gauss lens set. In order from the object side, it is formed of two cemented doublets, as follows: a positive meniscus lens element with its concave surface on the image side joined to a negative meniscus lens element with its concave surface on the image side (thereby forming a meniscus-shaped optical element with its concave surface on the image side), and a biconcave lens element that is joined to a biconvex lens element (thereby forming a meniscus-shaped optical element with its concave surface on the object side). Lens subgroup G2B is formed of a positive meniscus lens element with its concave surface on the object side. Lens subgroup G2C is also a Gauss lens set. In order from the object side, it is formed of two cemented doublets, as follows: a biconvex lens element that is joined to a biconcave lens element (thereby forming a meniscus-shaped optical element with its concave surface on the image side, and a biconcave lens element that is joined to a biconvex lens element (thereby forming a meniscus-shaped optical element with its concave surface on the object side).

The objective lens of FIG. 9 uses liquid immersion. The immersion liquid between the object surface and the first lens surface of the first lens group G1 has a refractive index of 1.333 and an Abbe number of 55.79.

Table 2 below lists for each surface, in order from the object side, the surface number #, the radius of curvature R (in mm), the on-axis spacing d (in mm) between surfaces, as well as the index of refraction $N_d$ and the Abbe number $\upsilon_d$ (both at the d line) of each lens element of FIG. 9. In the bottom portion of the table are listed the values of the numerical aperture NA, the focal length F of the objective lens, and the working distance WD between the object surface and the first lens surface of the first lens group G1.

TABLE 2

| # | R | d | $N_d$ | $v_d$ |
|---|---|---|---|---|
| 1 | ∞ | 1.6100 | 1.45853 | 67.94 |
| 2 | −2.4060 | 5.7597 | 1.75500 | 52.32 |
| 3 | −6.5059 | 0.2000 | | |
| 4 | −25.5003 | 3.1500 | 1.49700 | 81.08 |
| 5 | −10.9323 | 0.1200 | | |
| 6 | 56.1096 | 6.4800 | 1.49700 | 81.08 |
| 7 | −11.9889 | 1.9500 | 1.52944 | 51.72 |
| 8 | −25.3665 | 0.1200 | | |
| 9 | 223.7456 | 1.9500 | 1.75500 | 52.32 |
| 10 | 17.0397 | 6.5000 | 1.43875 | 94.99 |
| 11 | −25.4913 | 0.1200 | | |
| 12 | 12.1419 | 4.8264 | 1.43875 | 94.99 |
| 13 | 30.1344 | 0.2000 | | |
| 14 | 10.8233 | 4.7695 | 1.43875 | 94.99 |
| 15 | 26.5356 | 1.5024 | 1.59551 | 39.21 |
| 16 | 6.2707 | 6.1162 | | |
| 17 | −6.9886 | 1.5000 | 1.61340 | 43.84 |
| 18 | 18.1665 | 6.3698 | 1.43875 | 94.99 |
| 19 | −11.5665 | 0.2500 | | |
| 20 | −26.3050 | 3.3649 | 1.49700 | 81.08 |
| 21 | −11.8757 | 0.1200 | | |
| 22 | 10.9414 | 7.0500 | 1.43875 | 94.99 |
| 23 | −25.6275 | 1.6500 | 1.52944 | 51.72 |
| 24 | 8.8733 | 5.6500 | | |
| 25 | −8.4093 | 1.7500 | 1.51633 | 64.14 |
| 26 | 95.8203 | 5.1500 | 1.61293 | 36.99 |
| 27 | −12.3982 | | | |

NA = 0.94
F = 9.006 mm
WD = 2.04 mm

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A microscope comprising:
   a light source that emits light in a wavelength range that includes both visible and infrared wavelengths;
   an illuminating optical system for illuminating a specimen with the light from the light source;
   an objective lens for gathering light from the specimen and causing it to converge;
   a light beam dividing unit that divides the beam of light from the objective lens into plural divided light paths such that the wavelength ranges in the divided light paths differ from one another;
   a magnification conversion optical system in one of the divided light paths, for converting the magnification of images formed by light in that divided light path;
   two imaging devices, each located along a different divided light path;
   wherein
   said objective lens has a magnifying power less than or equal to 32 and a numerical aperture greater than or equal to 0.80.

2. A microscope according to claim 1, wherein:
   said magnification conversion optical system is arranged in a portion of a divided light path that is substantially orthogonal to the optical axis of the objective lens; and
   following the magnification conversion optical system, the divided light path has a deflecting optical element that deflects the light so as to travel in a direction substantially parallel to the optical axis of the objective lens, and wherein the following Condition (1) is satisfied $$150 \text{ mm} \leq D \leq 300 \text{ mm} \quad \text{Condition (1)}$$

where
   D is the distance from the light path dividing unit of the light path dividing unit to the deflecting optical element.

3. A microscope according to claim 2, wherein the following Condition (2) is satisfied $$\beta_2/\beta_1 \geq 5 \quad \text{Condition (2)}$$

where
   $\beta_1$ is the lowest magnifying power of the magnification conversion optical system, and
   $\beta_2$ is the highest magnifying power of the magnification conversion optical system.

4. A microscope according to claim 1, wherein the following Condition (2) is satisfied $$\beta_2/\beta_1 \geq 5 \quad \text{Condition (2)}$$

where
   $\beta_1$ is the lowest magnifying power of the magnification conversion optical system, and
   $\beta_2$ is the highest magnifying power of the magnification conversion optical system.

5. The microscope according to claim 1, and further comprising: a magnification conversion optical system in another of the divided light paths, for converting the magnification of images formed by light in that divided light path.

6. The microscope according to claim 5, wherein the magnification of the magnification conversion optical systems can be made equal in two of the divided optical paths.

7. The microscope according to claim 3, wherein one magnification conversion optical system includes one or more neutral density filters so that the brightness of the images is substantially matched among at least two of the divided light paths.

8. A microscope comprising:
   a light source that emits light in a wavelength range that includes both visible and infrared wavelengths;
   a first illuminating optical system for illuminating a specimen with infrared light as well as visible light from a first light source;
   a second illuminating optical system for illuminating a specimen with wavelengths that will excite fluorescence, thereby enabling the specimen to simultaneously be observed at a wavelength of fluorescent emission;
   an objective lens for gathering light from the specimen and causing it to converge;
   a light beam dividing unit that divides the beam of light from the objective lens into plural divided light paths such that the wavelength ranges in the divided light paths differ from one another;
   a magnification conversion optical system in one of the divided light paths, for converting the magnification of images formed by light in that divided light path; and
   at least two imaging devices, one located in each of the at least two divided light paths; wherein
   said objective lens has a magnifying power less than or equal to 32 and a numerical aperture greater than or equal to 0.80.

9. The microscope as set forth in claim 1, and further comprising:
   an illuminating optical system for illuminating a specimen with wavelengths that will excite fluorescence, thereby enabling the specimen to be simultaneously observed at a wavelength of fluorescent emission.

* * * * *